(12) United States Patent
Macours et al.

(10) Patent No.: US 12,003,264 B2
(45) Date of Patent: Jun. 4, 2024

(54) SIGNAL PROCESSOR FOR A RADIO RECEIVER

(71) Applicant: NXP B.V., Eindhoven (NL)

(72) Inventors: Christophe Marc Macours, Hodelge (BE); Temujin Gautama, Boutersem (BE); Alexander Barry Young, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/823,263

(22) Filed: Aug. 30, 2022

(65) Prior Publication Data

US 2023/0088440 A1 Mar. 23, 2023

(30) Foreign Application Priority Data

Sep. 17, 2021 (EP) ...................................... 21197398

(51) Int. Cl.
*H04B 1/12* (2006.01)

(52) U.S. Cl.
CPC ...................................... *H04B 1/12* (2013.01)

(58) Field of Classification Search
CPC ...................................... H04B 1/12
See application file for complete search history.

(56) References Cited

U.S. PATENT DOCUMENTS

| | | | |
|---|---|---|---|
| 3,936,758 A * | 2/1976 | Kostelnicek | H03L 7/00 455/305 |
| 4,189,679 A * | 2/1980 | Amazawa | H04B 1/12 455/224 |
| 4,480,335 A * | 10/1984 | Kishi | H04B 1/10 455/212 |
| 4,845,466 A | 7/1989 | Hariton et al. | |
| 5,025,208 A * | 6/1991 | Danzeisen | G01R 19/0007 455/226.1 |
| 5,671,247 A * | 9/1997 | Souissi | H04B 1/7102 375/E1.023 |
| 8,897,402 B2 | 11/2014 | Mehboob et al. | |
| 9,064,388 B1 | 6/2015 | Razazian et al. | |
| 9,270,388 B2 | 2/2016 | Bernstein et al. | |
| 9,374,257 B2 | 6/2016 | Sedarat | |
| 9,543,994 B1 | 1/2017 | Kose et al. | |
| 10,812,119 B1 | 10/2020 | Ciacci et al. | |
| 2007/0030913 A1 | 2/2007 | Lin | |
| 2009/0002211 A1 * | 1/2009 | Breems | H03M 3/354 341/143 |
| 2010/0219876 A1 | 9/2010 | Popescu | |

(Continued)

FOREIGN PATENT DOCUMENTS

JP 2009302766 A * 12/2009

OTHER PUBLICATIONS

Hattori, Y., "Noise Suppression Method for an AM Radio Receiver Using Digital Signal Processing", Proc. of the 2016 International Symposium on Electromagnetic Compatibility—EMC Europe 2016, Sep. 5-9, 2016.

*Primary Examiner* — Junpeng Chen (57) ABSTRACT

A signal processor and method of signal processing for a radio receiver is described. An input signal is received together with a spectral repetition interval value of an interferer signal. An interference reference signal is generated from the received spectral repetition interval value and the received signal. The received signal is adapted using the generated interference reference signal.

17 Claims, 5 Drawing Sheets

(56) References Cited

U.S. PATENT DOCUMENTS

| | | | |
|---|---|---|---|
| 2014/0316778 A1* | 10/2014 | Venkatesha | G10L 21/0208 |
| | | | 704/233 |
| 2016/0324478 A1* | 11/2016 | Goldstein | A61B 5/11 |
| 2018/0050171 A1* | 2/2018 | Tabert | C11D 3/50 |
| 2018/0253830 A1* | 9/2018 | Courtney | G06T 5/002 |
| 2021/0190903 A1* | 6/2021 | Kageme | G01S 13/06 |
| 2022/0057465 A1* | 2/2022 | Xie | G01R 33/5608 |

* cited by examiner

SIGNAL PROCESSOR FOR A RADIO RECEIVER

CROSS-REFERENCE TO RELATED APPLICATIONS

This application claims the priority under 35 U.S.C. § 119 of European Patent application no. 21197398.7, filed on 17 Sep. 2021, the contents of which are incorporated by reference herein.

FIELD

This disclosure relates to a signal processor and method of signal processing for a radio receiver.

BACKGROUND

Vehicle radio receivers which are part of car infotainment systems suffer from degraded analog and digital radio reception quality due to electrical motor interference. This is particularly a concern for AM radio, which is the only available radio medium to cover significant distance in many large countries such as the US, Japan, India and Australia. Other radio standards suffer as well due to increasing drive voltage and inverter switching frequencies, these are driven by efficiency improvements that improve switching losses by decreasing the switching time.

SUMMARY

Various aspects of the disclosure are defined in the accompanying claims. In a first aspect there is provided a method of signal processing for a radio receiver, the method comprising: receiving a signal; receiving a spectral repetition interval value of an interferer signal; generating an interference reference signal from the received spectral repetition interval value and the received signal; and adapting the received signal dependent on the interference reference signal.

In one or more embodiments, adapting the received signal dependent on the interference reference signal may further comprise subtracting the generated interference reference signal from the received signal.

In one or more embodiments, adapting the received signal dependent on the interference reference signal may further comprise muting the signal at one or more times corresponding to peaks of the generated interference reference signal.

In one or more embodiments, receiving a spectral repetition interval of the interferer signal may further comprise estimating the spectral repetition interval of a frequency magnitude spectrum of the received signal.

In one or more embodiments, estimating the spectral repetition interval may comprise determining an auto-correlation of the frequency magnitude spectrum of the received signal, and determining a first-order difference of the auto-correlation.

In one or more embodiments, generating the interference reference signal may further comprise: applying a time-to-frequency transform to generate a frequency magnitude spectrum of the received signal; splitting the received signal frequency magnitude spectrum into a plurality of frames, each frame having a number of frequency bins having a magnitude value determined from the spectral repetition interval of the interferer signal; normalizing a magnitude value of each frequency bin in each frame of the plurality of frames; determining an interference model frame from the plurality of frames; generating an extended interference reference model by replicating the interference model frame and de-normalizing each replicated interference model frame; comparing the frequency bins of the extended interference reference model and the frequency bins of the received signal frequency magnitude spectrum to determine which frequency bins include interference; modifying the extended interference reference model dependent on the comparison; and generating the interference reference signal from the modified extended interference reference model.

In one or more embodiments, a normalisation factor may be determined from at least one of a peak value and an average value of each frame. In one or more embodiments, a normalisation factor is determined from a peak bin position of the interference model frame. In one or more embodiments, generating the interference reference signal may further comprise: applying a frequency-to-time transform to the modified extended interference reference model In one or more embodiments, comparing the frequency bins of the extended interference reference model and the frequency bins of the received signal spectrum may further comprise: determining a weighting factor value from the interference model frame for each frequency bin in the plurality of frames; and modifying the extended interference reference model by setting the magnitude value of each frequency bin to a weighted sum of the value of the received signal frequency magnitude spectrum and the extended interference reference model frequency magnitude spectrum.

In one or more embodiments, the generated interference reference signal may be subtracted from the received signal in the frequency domain.

In one or more embodiments, the method may further comprise comparing each sample of the generated interference reference signal with a threshold value and adapting the value of each sample dependent on the comparison.

In one or more embodiments, the method may further comprise receiving a further spectral repetition interval value of a further interferer signal; generating a further interference reference signal from the further spectral repetition interval value and the received signal; and subtracting the further generated interference reference signal from the received signal.

In a second aspect, there is provided a non-transitory computer readable media comprising a computer program comprising computer executable instructions which, when executed by a computer, causes the computer to perform a method of signal processing for a radio receiver, the method comprising: receiving a signal; receiving a spectral repetition interval value of an interferer signal; generating an interference reference signal from the received spectral repetition interval value and the received signal; and adapting the received signal dependent on the interference reference signal.

In a third aspect, there is provided a signal processor for a radio receiver, the signal processor comprising: a signal input configured to receive a signal; an output an interference synthesizer having a first synthesizer input coupled to the signal input, a second synthesizer input configured to receive a spectral repetition interval value of an interferer signal, and a synthesizer output, and configured to generate an interference reference signal from the spectral repetition interval value and the received signal, and to output the interference reference signal on the synthesizer output; and wherein the signal processor is configured to adapt the received signal dependent on the interference reference signal and to provide the adapted received signal to the output.

In one or more embodiments, the signal processor may further comprise an adder having a first adder input coupled to the signal input, a second adder input coupled to the synthesizer output and wherein the signal processor is configured to adapt the received signal by subtracting the generated interference reference signal from the received signal.

In one or more embodiments, the signal processor may further comprise a frequency estimator having a frequency estimator input coupled to the signal input, and a frequency estimator output coupled to the second synthesizer input, and configured to estimate the frequency domain spectral repetition interval of a frequency magnitude spectrum of the received signal.

In one or more embodiments, the frequency estimator may be further configured to estimate the spectral repetition interval of the interferer signal by determining an auto-correlation of the frequency magnitude spectrum of the received signal, and determining a first-order difference of the auto-correlation.

In one or more embodiments, the interference synthesizer may further comprise: a fast fourier transform module (FFT) having an FFT input coupled to the first synthesizer input a FFT magnitude output and a FFT phase output; A reshaper module having a reshaper output, a first reshaper input coupled to the second synthesizer input, and a second reshaper input coupled to the FFT magnitude output, and configured to: receive a signal frequency magnitude spectrum on the second reshaper input, split the received signal frequency magnitude spectrum into a plurality of frames, each frame having a number of frequency bins dependent on the spectral repetition interval of the interferer signal, each frequency bin having a magnitude value; normalize the magnitude value of each frequency bin in each frame; and output the normalized plurality of frames; an analyser module having a first analyser output, a second analyser output, and an analyser input coupled to the reshaper output, and configured to output an interference model frame determined from the plurality of frames on the first analyser output and an expected variability of each bin in the interference model frame on the second analyser output; a replicator module having a replicator output, and a replicator input coupled to the first analyser output and configured to generate an extended interference reference model by replicating the interference model frame and de-normalizing each replicated interference model frame; and a combiner module having a first combiner input coupled to the FFT magnitude output, a second combiner input coupled to the second analyser output, a third combiner input coupled to the replicator output, and a combiner output coupled to the synthesizer output, and configured to compare the frequency bins of the extended interference reference model and the frequency bins of the received signal spectrum to determine which frequency bins include interference, and generate the interference reference signal from the frequency bins in the received signal spectrum including interference.

In one or more embodiments, the analyser module may be configured to determine the interference model frame by determining one of an average value and a median value of each bin in the plurality of frames.

In one or more embodiments, the analyser module may be configured to determine the expected variability of each bin from a standard variation of each bin value in the plurality of frames.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION OF EMBODIMENTS

Figure 1:
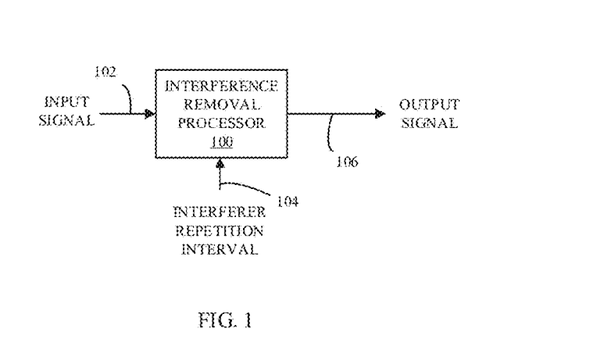
FIG. 1 shows a signal processor for a radio receiver according to an embodiment.
Figure 2:
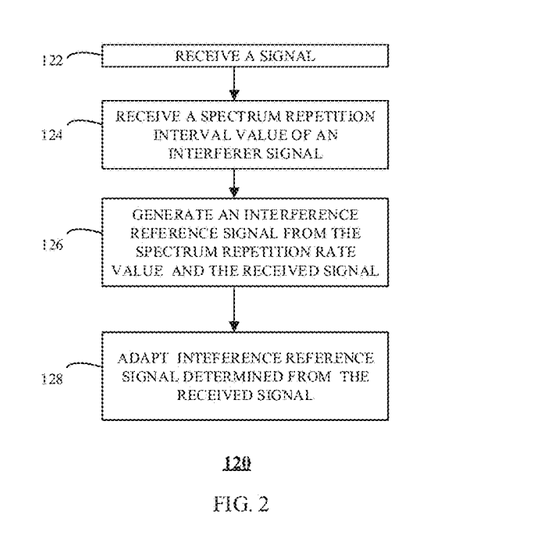
FIG. 2 illustrates method of signal processing for a radio receiver according to an embodiment.

FIG. 1 shows a signal processor 100 for a radio receiver according to an embodiment. The signal processor 100 may also be referred to as an interference removal processor. The signal processor 100 may have a signal input 102, a interferer repetition interval input 104 and a signal processor output 106. The operation of the signal processor 100 is illustrated in FIG. 2 which shows a method of signal processing 120 for a radio receiver. In step 122, a signal may be received at the signal input 102 by a radio receiver for example an AM, FM, or other audio broadcast radio signal. In step 124 a spectral repetition interval value of an interference signal may be received on the interferer repetition interval 104. This spectral repetition interval value may for example correspond to a frequency value between peaks in a frequency spectrum of an interferer with a quasi-repetitive frequency spectrum. An example interferer with a quasi-repetitive frequency spectrum may be for example interference from an electric motor driven by a an inverter controlled PWM control signal. In this example the spectral repetition interval value may correspond to the frequency of the inverter control signal. In step 126, an interference reference signal may be generated based on the spectral repetition interval value which may be used to determine which frequencies in the input signal are likely to be noise and which frequencies are due to the audio signals broadcast to the radio receiver. In step 128, the signal may be adapted dependent on the generated interference reference signal. In some examples, the signal may be adapted by subtracting the generated interference reference signal from the original received signal.

In some examples, the signal may be adapted by muting the received signal for example by setting the signal magnitude values to zero at one or more times corresponding to peaks of the generated interference reference signal. In this example, packet loss concealment techniques may also be used for example as described in ITU G.711 Appendix 1 "A high quality low-complexity algorithm for packet loss concealment with G.711", International Telecommunication Union, September 1999.

In an example, some interference sources may have a quasi-repetitive frequency spectrum. One example of such an interferer is an electric motor which is driven by an inverter. The resulting interference source may have a quasi-repetitive frequency spectrum corresponding to the inverter switching frequency. This quasi-repetitive frequency spectrum may be used to generate a model of the interferer signal which may then be used to adapt received signal to improve the signal to noise ratio.

For example in vehicles, for efficiency reasons, pulse-width modulation (PWM) switching is used in many power transmission systems within a vehicle, including the main traction, mirror, wiper, window, seat and air conditioning motors. This method produces a characteristic interference spectrum. Other interference sources can include, but are not limited to, inverters for lighting, DC/DC conversion and plug in or wireless charging. In addition, for electric vehicles (EV) the traction motors, which may number up to 4 or more, each employ an inverter to convert a DC voltage to sinusoidal like waveforms to drive each motor. The inverter switches up to 800 V DC at its input to create a 3-phase sinusoidal like output waveform, the control inputs to the inverter are rotation frequency and output amplitude. The switching frequency can be constant or variable, and is typically orders of magnitude higher than the rotation frequency.

The typically used PWM sinusoidal switching scheme produces a quasi-repetitive spectrum with each repetition spaced at (sub-)intervals of the switching frequency with side-bands at multiples of the rotation frequency.

Figure 3:
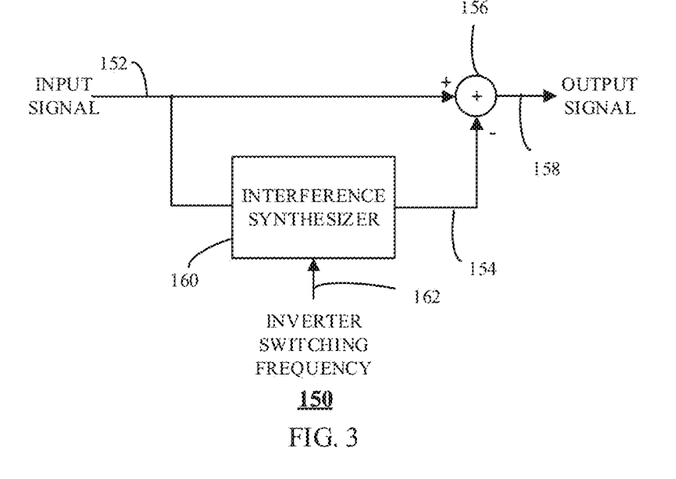
FIG. 3 shows a signal processor for a radio receiver according to an embodiment.

FIG. 3 shows a signal processor or interference removal processor 150 for a radio receiver according to an embodiment. A signal input 152 may be connected to a first synthesizer input of an interference synthesizer 160. The interference synthesizer 160 may also have a second synthesizer input 162. An interference synthesizer output 154 may be connected to a first adder input of an adder 156. The second adder input of adder 156 may be connected to the signal input 152. An adder output of the adder 156 may be connected to the signal processor output 158.

In operation, the signal processor 150 may receive a signal on the signal input 152. The signal may for example be derived from a radio signal such as an AM signal, FM signal or DAB signal. The signal may be the original antenna signal or a complex-valued IF signal in a frequency range of interest. The interference synthesizer 160 may receive a value corresponding to the inverter switching frequency of an electric motor on the second synthesizer input 162. Examples of interference sources for radio signals may for example be interference due to the operation of an electric motor driven by an inverter. The switching frequency of the inverter may be correlated to the frequency of the resulting electrical interference signal due to the electric motor resulting in the interferer having a predictable spectral repetition interval. This information may be used by the interference synthesizer 160 to generate an interference reference signal on the interference synthesizer output 154. This interference reference signal may then be subtracted from the original input signal by the adder 156. The resulting signal may be output from the adder 156 to the signal processor output 158.

The input signal bandwidth may be a multiple of the inverter switching frequency in order improve the accuracy of the interference model.

Figure 4:
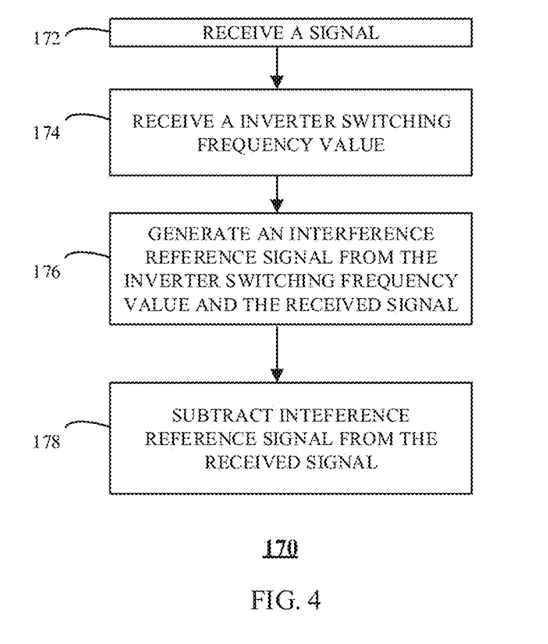
FIG. 4 illustrates method of signal processing for a radio receiver according to an embodiment.

FIG. 4 shows a method of signal processing 170 for a radio receiver. In step 172, a signal may be received by a radio receiver for example an AM, FM, or other audio broadcast radio signal. In step 174 a spectral repetition interval value of an interference signal may be received. In step 176, an interference reference signal may be generated based on the interferer frequency value which may be used to determine which frequencies in the input signal are likely to be noise and which frequencies are due to the audio signals broadcast to the radio receiver. In step 178, the interference reference signal generated in step 176 may be subtracted from the original received signal.

Figure 5:
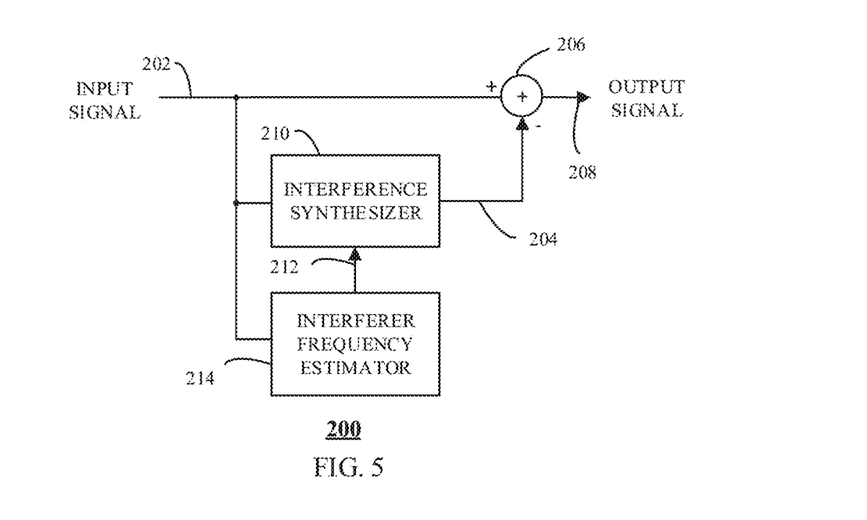
FIG. 5 shows a signal processor for a radio receiver according to an embodiment.

FIG. 5 shows a signal processor 200 for a radio receiver according to an embodiment. A signal input 202 may be connected to a first input of an interference synthesizer 210. The interference synthesizer 210 may also have a second input 212 connected to a frequency estimator output of an interferer frequency estimator 214. A frequency estimator input of the interferer frequency estimator 214 may be connected to the signal input 202. An interference synthesizer output 204 may be connected to a first input of an adder 206. The second input of adder 206 may be connected to the signal input 202. An output of the adder 206 may be connected to the signal processor output 208.

In operation, the signal processor 200 may receive a signal on the signal input 202. The interference synthesizer 210 may receive a spectral repetition interval value corresponding to the expected frequency of an interference source which may be an estimated frequency determined by interferer frequency estimator 214. The estimated frequency may be used by the interference synthesizer 210 to generate an interference reference signal on the interference synthesizer output 204. The interference reference signal may then be subtracted from the original input signal by the adder 206. The resulting signal may be output from the adder 206 to the signal processor output 208.

In an example, the quasi-repetitive nature of the interference spectrum described earlier can be exploited to model the interference spectrum even in the presence of other spectrum components such as AM signals, etc. The signal processors 100, 150, 200 may denoise an RF signal corrupted for example by EV traction and other PWM based inverter interferences. The inverter switching frequency may be used to synthesise the interference from an average of the interference spectral repetitions. The synthesised interference reference is then subtracted from the input signal in the time or frequency domain. In some examples for AM radio reception the interference reduction may be 30 dB.

Prior methods may for example suppress the main AM carriers from the input IF signal to improve the time domain detection of interferences. In the case of strong AM stations, not only are the carriers but also the side-bands hamper detecting interferences such as pulses with time domain pulse detection. Suppressing the complete side-band frequency range would therefore be required, e.g. by notch-filtering the AM bands with a bandwidth of 12 kHz centred around each carrier. In this case not only the AM signals would be suppressed, but also the frequency components of the interference located within the suppressed AM bands. Consequently, the remaining time domain pulse interference would no longer be representative of the actual pulse interference, and the EV noise suppression performance would be greatly impaired.

Suppressing all dominant frequency components of the RF input signal (including low rate FSK, digital radio, FM, continuous tones and random walk tones) in order to improve the time domain detection of the interference pulses may lead to the undesired suppression of many interference frequency components, and hence, corrupt the time domain estimate of the interference. By generating an interference reference signal based on identifying the spectral repetition interval of a likely interferer, suppression of interference due to pulses may be improved.

Figure 6:
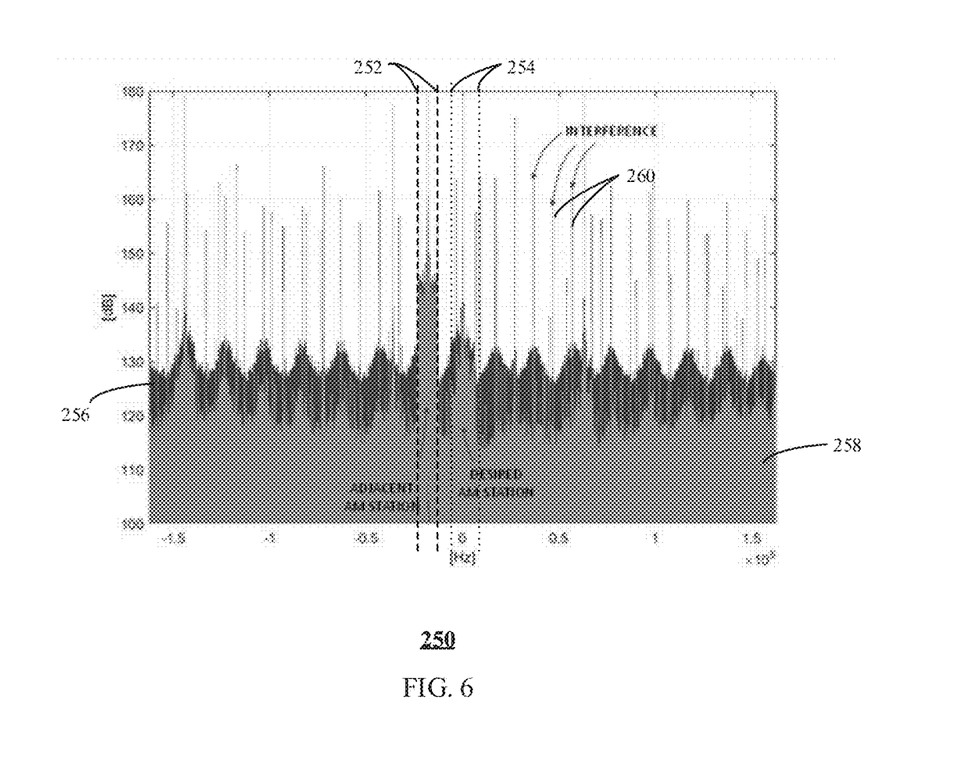
FIG. 6 shows an example spectrogram of an AM radio signal after signal processing the input signal using the method of FIG. 2 or 4 or the signal processor of FIG. 1 or 3.

FIG. 6 shows an example spectrogram 250 for AM radio reception of an input signal with frequency on the x-axis ranging between −30 kHz and +30 kHz and time on the y-axis, ranging from 0 to 20 seconds. The example input signal includes a desired AM radio station 254 centred nominally at 0 kHz, and an adjacent AM radio station 252 centred nominally at −20 kHz. An example interference 260 may be caused by an electric motor powering a vehicle. The first spectrogram 256 shows the situation with interference. The second spectrogram 258 shows the result after de-noising for example using signal processors 100,150,200 or methods 120,170.

Figure 7:
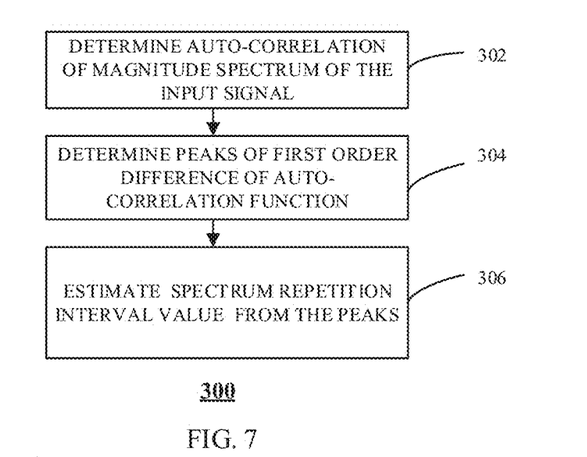
FIG. 7 shows a method of estimating an inverter frequency according to an embodiment.

FIG. 7 shows a method 300 of estimating the interferer spectrum repetition interval. The method 300 may be used for example to implement the interferer frequency estimator 214. In step 302, the auto-correlation function of the magnitude spectrum of the input signal may be determined. In step 304, a peak value of the auto-correlation may be determined. In step 306, an interferer frequency may be estimated from the non-zero lag peak values of the first-order difference of the auto-correlation.

In an example, an interferer source such as a motor driven by an inverter can have a switching frequency estimated by tracking the frequency domain period of the repeating interference patterns. This switching frequency may correspond to the spectrum repetition interval of an interferer signal. This estimation may for example include processing the auto-correlation function of the input signal frequency magnitude spectrum. Since the expected interference pattern is quasi or loosely replicated across the frequency magnitude spectrum, the second peak in the autocorrelation function indicates the distance between repetitions, which corresponds to the inverter switching frequency.

Figure 8A:
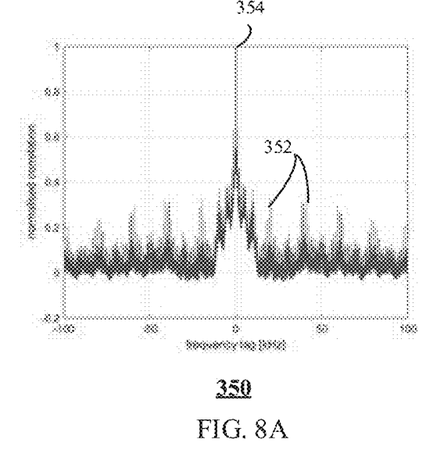
FIG. 8A illustrates an example auto correlation spectrum of a time segment of an input signal.
Figure 8B:
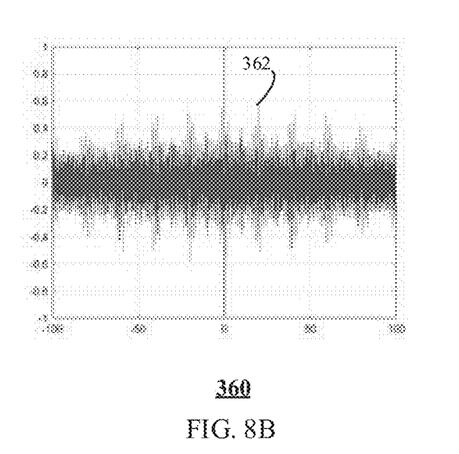
FIG. 8B illustrates the first order difference of the auto correlation spectrum of FIG. 8A.

FIG. 8A shows the autocorrelation function 350 at a given time segment. The frequency between −100 kHz to +100 kHz is on the x-axis. The normalised correlation value is plotted on the y-axis It can be observed that there are many peaks 352 outside the central region 354, which may be used to determine the inverter frequency. FIG. 8B shows the first-order difference 360 of the auto-correlation function. The largest peak 362 outside a central region of for example, +/−5 kHz corresponds to the inverter frequency of 20 kHz. This peak may be tracked over time to cope with a changing inverter frequency, and may also render the estimate more robust, if the inverter frequency changes slowly over time.

Figure 9:
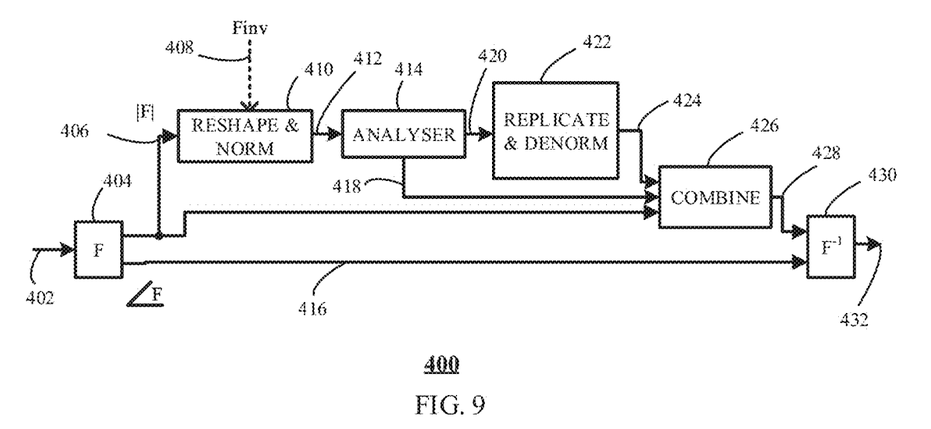
FIG. 9 shows a signal processor for a radio receiver according to an embodiment.

FIG. 9 shows an interference synthesizer 400 which may be used to implement the interference synthesizers 160, 210. Interference synthesizer 400 includes a fast Fourier transform (FFT) module 404, a reshaper module 410, an analyser module 414, a replicator module 422, a combiner module 426 and an inverse FFT module 430. In other examples other frequency-to-time and time-to-frequency modules may be used instead of FFT module 404 and iFFT module 430 such as for example, other Fourier transform methods or wavelet transforms. In some examples, the frequency-to-time and time-to-frequency modules may also include windowing and overlap-add functions. The FFT module 404 has an FFT input coupled to the interference synthesizer input 402. The FFT module has an FFT magnitude output 406 and an FFT phase output 416. The FFT magnitude output 406 may be connected to a first reshaper input of the reshaper module 410 and a first combiner input of the combiner module 426.

The reshaper module 410 has a second reshaper input 408 for receiving an interferer frequency value. The reshaper module 410 has a reshaper output 412 connected to an analyser input of the analyser module 414. The analyser module 414 has a first analyser output 420 connected to a replicator input of the replicator module 422. The analyser module 414 has a second analyser output 418 connected to a second combiner input of the combiner module 426. A replicator output 424 may be connected to a third combiner input of the combiner module 426. A combiner output 428 may be connected to a first iFFT input of inverse FFT module 430. A second iFFT input of the inverse FFT module 430 may be connected to the FFT phase output 416. The combiner output may be connected to the interference synthesizer output 432.

The interference synthesizer 400 obtains an interference model reference by exploiting the quasi-repetitive nature of the spectrum. In operation, an input signal may be received at interference synthesizer input 402. The frequency magnitude spectrum may be determined by the FFT module 404. The frequency magnitude spectrum is output on FFT magnitude output 406.

The reshaper module 410 may reshape the frequency magnitude spectrum into frames of length Finv, where Finv is the interferer spectrum repetition interval and the frames are normalised to account for possible spectrum level variations. For example for a received signal spectrum including 1000 frequency bins, the FFT domain may be split into frames of 100 bins where 100 bins corresponds to the spectrum repetition interval of the interferer. The interference is considered a cyclo-stationary process in the FFT domain which may allow a statistical separation between the interference and a wanted signal such as the AM radio signal. In some examples, the normalisation factor can be determined based on the peak value in the frame, or on the average power in the frame. In some examples, the normalisation factor can be determined based on the magnitude at the expected peak position which is known from the peak bin position in the across-frame average (without normalisation).

The normalised frames may be output from the reshaper module 410 and then statistically analysed by the analyser module 414 which may output an interference model frame on the first analyser output 420 and, optionally, a signal mask on second analyser output 418 that reflects the probability that a given frequency bin contains only the interference.

The analyser module 414 may determine the interference model frame from the separate normalised frames (and optionally, from the frames of a number of past time segments) as the expected magnitude for each frequency bin in the interference model frame. This may be done for example by determining an average value for bin0 in frame0, bin0 in frame1, bin0 in frame 2 and so on. Alternatively or in addition, in other examples a median value may be determined.

The analyser module 414 may determine the expected variability for each bin in the interference model frame, for example as the standard deviation across frames. This allows for the generation of a signal mask which assigns a determined frequency bin mask value between zero and unity to each frequency bin. In some examples, the signal mask may be zero if it originates from the interference, for example if the (normalised) magnitude of a bin falls within the expected range, for example within 1 standard deviation of the corresponding bin in the interference model, and it is unity if it does not originate within the expected range. In other examples a value between 0 and 1 may be used. The signal mask may be considered as a weighting factor for each respective frequency bin. The signal mask may be output on the second analyser output 418. In other examples, other measures of variability may be used such as median absolute deviation.

The interference model frame consists of a frequency magnitude spectrum and may then be replicated across the entire spectrum by replicator module 422 resulting in an extended interference reference model. For example for an interference model frame of 100 bins replicated 10 times. The replicator module 422 may scale (de-normalise) each segment, i.e. each replicated interference model frame to the original power. The replicator module 422 may output an extended interference model frequency magnitude spectrum on replicator output 424.

The combiner module 426 may combine the extended interference model spectrum with the original magnitude spectrum on the basis of the signal mask. For example the original magnitude spectrum may be compared with the statistics repeated vector and a decision is made whether a certain bin is interference or not based on the comparison. The values in the original magnitude spectrum deemed not to be interference may be cancelled out in frequency domain by setting them to zero, or by setting them to the corresponding values in the extended interference model spectrum.

The resulting modified extended interference model magnitude spectrum is then considered to be a model of the interference spectrum and is output on the combiner output 428. The inverse FFT module 430 may then apply an inverse FFT to the model of the interference spectrum together with the phase information of the original received signal to convert back into the time domain. The resulting signal is an interferer reference signal which is added to the input signal to remove the interference from the input signal as described in FIGS. 3, 5.

In some examples the model of the interference signal and may be subtracted from the original signal in the frequency domain by a subtractor before converting back to the time domain. In this case, the inverse FFT module may be omitted from the interference synthesizer.

In some examples, the time domain interference model reference may be further processed by a peak detector (not shown) to only keep the peak values and neighbouring time samples to form the interference reference. For example a sample may be labelled as a pulse when its magnitude exceeds a threshold value. This threshold value can be fixed, or it can be a function of the signal dynamics.

In some examples the interference synthesizer may process signals in consecutive or overlapping time domain frames. In case of a time-varying inverter switching frequency, each time domain frame may have a different interferer frequency value. The further generated interferer reference signal may then be subtracted from the input signal as previously described.

Figure 10:
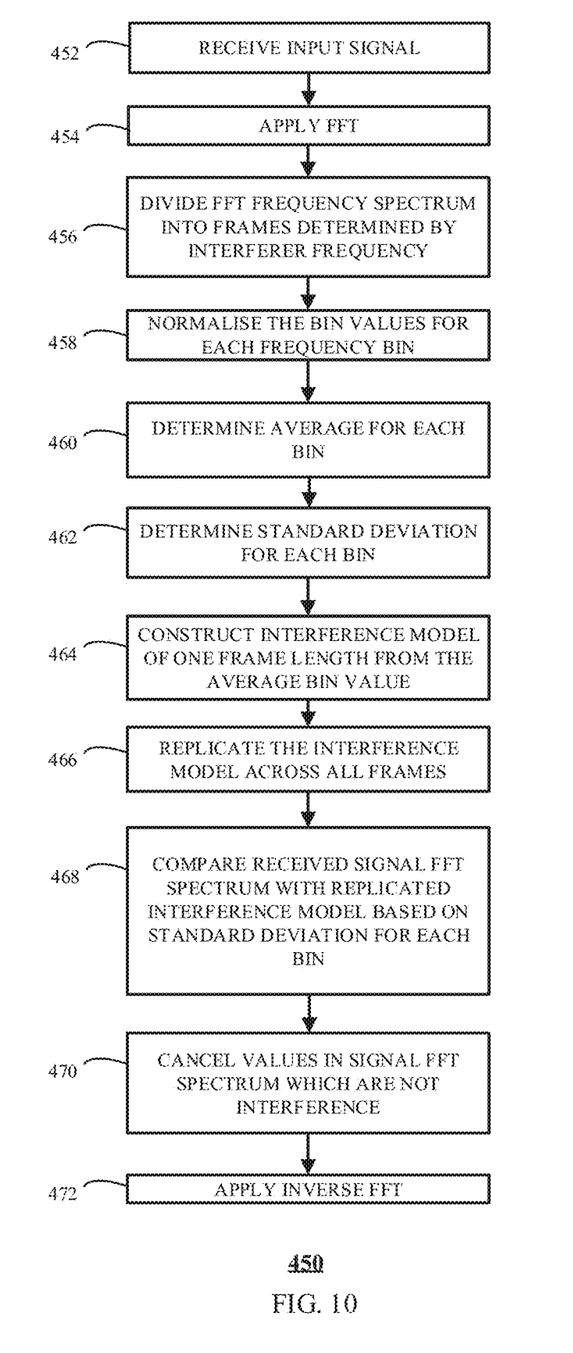
FIG. 10 shows a method of synthesizing an interference model from the input signal and the interferer frequency.

FIG. 10 shows a method of interference reference signal generation 450. In step 452, an input signal is received. In step 454 an FFT is applied to the input signal. In step 456, the frequency range may be divided into frames determined by an interferer frequency which may be a fixed value or a value estimated from the input signal. In step 458 the magnitude values for each frequency bin may be normalized (per frame).

In step 460 the average bin value across frames for each frame bin may be determined. The standard deviation for each frame bin may be determined in step 462. In step 464 the average bin value for each frame bin may be used to construct an interference model frame. In step 466, the interference model may be replicated across the frequency spectrum i.e. for a number of frames corresponding to the number of frames in step 456. In step 468 the received signal FFT spectrum may be compared with the replicated interference model for example based on the standard deviation value for each bin. In step 470, the signal FFT spectrum may be modified by cancelling the bin values in the signal FFT spectrum which are not interference. In step 472 an inverse FFT may be applied to the modified signal FFT spectrum.

A signal processor and method of signal processing for a radio receiver is described. An input signal is received together with a spectral repetition interval value of an interferer signal. An interference reference signal is generated from the received spectral repetition interval value and the received signal. The received signal is adapted using the generated interference reference signal.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

What is claimed is:

1. A method of signal processing for a radio receiver, the method comprising:
   receiving a signal;
   receiving a spectral repetition interval value of an interferer signal, the spectral repetition interval value based on a frequency domain period of repeating interference patterns;
   generating an interference reference signal from the received spectral repetition interval value and the received signal, wherein generating the interference reference signal comprises:
      applying a time-to-frequency transform to generate a frequency magnitude spectrum of the received signal;
      splitting the received signal frequency magnitude spectrum into a plurality of frames, each frame having a number of frequency bins having a magnitude value determined from the spectral repetition interval of the interferer signal;
      normalizing a magnitude value of each frequency bin in each frame of the plurality of frames;
      determining an interference model frame from the plurality of frames;
      generating an extended interference reference model by replicating the interference model frame and de-normalizing each replicated interference model frame;
      comparing the frequency bins of the extended interference reference model and the frequency bins of the received signal frequency magnitude spectrum to determine which frequency bins include interference;
      modifying the extended interference reference model dependent on the comparison; and
      generating the interference reference signal from the modified extended interference reference model; and
   adapting the received signal dependent on the interference reference signal.

2. The method of claim 1, wherein adapting the received signal dependent on the interference reference signal further comprises subtracting the generated interference reference signal from the received signal.

3. The method of claim 1, wherein adapting the received signal dependent on the interference reference signal further comprises muting the signal at one or more times corresponding to peaks of the generated interference reference signal.

4. The method of claim 1, wherein receiving a spectral repetition interval of the interferer signal further comprises estimating the spectral repetition interval of a frequency magnitude spectrum of the received signal.

5. The method of claim 4, wherein estimating the spectral repetition interval comprises: determining an auto-correlation of the frequency magnitude spectrum of the received signal, and determining a first-order difference of the auto-correlation.

6. The method of claim 1, wherein a normalisation factor is determined from at least one of a peak value and an average value of each frame.

7. The method of claim 1, wherein a normalisation factor is determined from a peak bin position of the interference model frame.

8. The method of claim 1, wherein generating the interference reference signal further comprises:
   applying a frequency-to-time transform to the modified extended interference reference model.

9. The method of claim 1, wherein comparing the frequency bins of the extended interference reference model and the frequency bins of the received signal spectrum further comprises:
   determining a weighting factor value from the interference model frame for each frequency bin in the plurality of frames; and
   modifying the extended interference reference model by setting the magnitude value of each frequency bin to a weighted sum of the value of the received signal frequency magnitude spectrum and the extended interference reference model frequency magnitude spectrum.

10. The method of claim 1 further comprising comparing each sample of the generated interference reference signal with a threshold value and adapting the value of each sample dependent on the comparison.

11. A non-transitory computer readable media comprising a computer program comprising computer executable instructions which, when executed by a computer, causes the computer to perform the method of claim 1.

12. A signal processor for a radio receiver, the signal processor comprising:
   a signal input configured to receive a signal;
   an output;
   an interference synthesizer having a first synthesizer input coupled to the signal input, a second synthesizer input configured to receive a spectral repetition interval value of an interferer signal, and a synthesizer output, and configured to generate an interference reference signal from the spectral repetition interval value and the received signal, to output the interference reference signal on the synthesizer output, and to generate the interference reference signal by applying a frequency-to-time transform to the modified extended interference reference model, the interference synthesizer comprising:
   a fast fourier transform, FFT, module having an FFT input coupled to the first synthesizer input a FFT magnitude output and a FFT phase output;
   a reshaper module having a reshaper output, a first reshaper input coupled to the second synthesizer input, and a second reshaper input coupled to the FFT magnitude output, and configured to receive a signal frequency magnitude spectrum on the second reshaper input, split the received signal frequency magnitude spectrum into a plurality of frames, each frame having a number of frequency bins dependent on the spectral repetition interval of the interferer signal, each frequency bin having a magnitude value, normalize the magnitude value of each frequency bin in each frame, and output the normalized plurality of frames;
   an analyser module having a first analyser output, a second analyser output, and an analyser input coupled to the reshaper output, and configured to output an interference model frame determined from the plurality of frames on the first analyser output and an expected variability of each bin in the interference model frame on the second analyser output;

a replicator module having a replicator output, and a replicator input coupled to the first analyser output and configured to generate an extended interference reference model by replicating the interference model frame and de-normalizing each replicated interference model frame; and a combiner module having a first combiner input coupled to the FFT magnitude output, a second combiner input coupled to the second analyser output, a third combiner input coupled to the replicator output, and a combiner output coupled to the synthesizer output, and configured to compare the frequency bins of the extended interference reference model and the frequency bins of the received signal spectrum to determine which frequency bins include interference, and generate the interference reference signal from the frequency bins in the received signal spectrum including interference; and wherein the spectral repetition interval value based on a frequency domain period of repeating interference patterns, and wherein the signal processor is configured to adapt the received signal dependent on the interference reference signal and to provide the adapted received signal to the output.

13. The signal processor of claim 12 further comprising a frequency estimator having a frequency estimator input coupled to the signal input, and a frequency estimator output coupled to the second synthesizer input, and configured to estimate the frequency domain spectral repetition interval of a frequency magnitude spectrum of the received signal.

14. The signal processor of claim 12, wherein the signal processor is further configured to adapt the received signal dependent on the interference reference signal by subtracting the generated interference reference signal from the received signal.

15. The signal processor of claim 12, wherein the signal processor is further configured to adapt the received signal dependent on the interference reference signal by muting the signal at one or more times corresponding to peaks of the generated interference reference signal.

16. The signal processor of claim 12, wherein the signal processor is further configured to compare each sample of the generated interference reference signal with a threshold value and adapt the value of each sample dependent on the comparison.

17. The signal processor of claim 13, wherein the frequency estimator is further configured to estimate the frequency domain spectral repetition interval of the frequency magnitude spectrum of the received signal by determining an auto-correlation of the frequency magnitude spectrum of the received signal and determining a first-order difference of the auto-correlation.

* * * * *